United States Patent [19]

Fegley et al.

[11] Patent Number: 4,513,852

[45] Date of Patent: Apr. 30, 1985

[54] ORIENTING ASYMMETRICALLY SHAPED ARTICLES

[75] Inventors: Charles R. Fegley, Laureldale; Joseph A. Tamashasky, New Philadelphia, both of Pa.

[73] Assignee: AT&T Technologies, Inc., New York, N.Y.

[21] Appl. No.: 430,581

[22] Filed: Sep. 30, 1982

[51] Int. Cl.³ .............................................. B65G 47/24
[52] U.S. Cl. ..................................................... 198/399
[58] Field of Search ................... 198/395, 399; 406/87

[56] References Cited

U.S. PATENT DOCUMENTS

| | | | |
|---|---|---|---|
| 3,058,569 | 10/1962 | Frank et al. | 198/491 |
| 3,305,070 | 2/1967 | Morlan et al. | 198/395 |
| 3,358,852 | 12/1967 | Fegley | 198/344 |
| 3,396,830 | 8/1968 | Hoffman | 198/399 |
| 4,171,041 | 10/1979 | Lowe | 198/399 X |
| 4,179,032 | 12/1979 | Artz et al. | 198/394 X |

*Primary Examiner*—Joseph E. Valenza
*Assistant Examiner*—David A. Bucci
*Attorney, Agent, or Firm*—G. W. Houseweart; D. C. Watson

[57] ABSTRACT

At least one article such as a device (10) is reoriented to achieve uniform orientation of a plurality thereof. The devices (10) typically have a head (12) and a body portion (18) depending therefrom along a plane (26) dividing the head asymmetrically. A portion of head (12) has a fully developed shape typically seen along one side of a disc while another portion of head (12) has at least one segment omitted. A preferably air powered track (30) is utilized to guidably advance the devices (10) in a single file. The body portions (18) are disposed in track (30) with their respective dividing planes (26) lying substantially along a common plane passing through a longitudinal slot (50) in a feed section of track (30). A device (10) is assumed to have a desirable orientation when its flat (24) faces such as to the back of track (30) and an undesirable orientation when flat (24) faces oppositely such as to the front of track (30). A turning station (60) is disposed in track (30) and contains a special section (75), such station being adapted for: (1) guidably passing to a subsequent discharge section of track (30), devices (10) advanced into station (60) with the desirable orientation and blocking a device (10) advanced therein having the undesirable orientation; and (2) turning the station track (75) with the blocked device (10) sufficiently to engage the previously trailing end of station track (75) to the subsequent discharge track and discharging thereto the turned device (10) now having the desirable orientation.

3 Claims, 8 Drawing Figures

ORIENTING ASYMMETRICALLY SHAPED ARTICLES

TECHNICAL FIELD

This invention relates to uniformly orienting asymmetrically shaped articles. More particularly, in a plurality of such articles having a mixed orientation, the invention relates to uniformly orienting the articles along a single file for a subsequent operation or purpose.

BACKGROUND OF THE INVENTION

There are many articles handled in industry which have distinctive features making their shapes appear asymmetric with respect to a datum such as a transverse midplane. A typical example of such an article is a common nail formed with a leading end having a point and a trailing end having a head. Such features become important when the article is put into its intended service. The distinctive features may also be important when handling the articles if uniform orientation is desired such as in loading a special packer or similar machine. Fortunately, many problems with uniformly orienting longitudinally asymmetrically shaped articles are solved with vibratory bowl feeders. Other problems are solved with machines which receive, sense and turn such articles as they are axially advanced.

Unlike most nails, some elongated articles also have transverse features which are irregular, making them further asymmetrically shaped with respect to a longitudinal datum. Such an article is typified in the electronics industry by some light emitting diodes (LEDs) having an optical head and leads depending therefrom along a generally central plane. The plane divides the head asymmetrically wherein lateral portions have distinctively different shapes to indicate electrical polarity for installation purposes. In the manufacture of such transversely asymmetric articles, portions thereof are sometimes treated in a manner relating to their transversely irregular features. For example, the LEDs described above sometimes have bottom portions of their leads offset in a given direction from the plane dividing the polarity indicating head. In a plurality of such articles of mixed orientation, all should be uniformly oriented in both longitudinal and transverse directions and preferably be thereby disposed in a single file to feed an operation such as lead shaping.

After such articles are vibratory loaded with heads upward in a single file, they are laterally advanced to and sometimes processed in a turntable having peripheral nests therein. The table is repeatedly rotationally indexed upon receiving successive ones of the articles which may be discharged into single file tracks. Unfortunately there are typically two types of files resulting therefrom, one having a uniformly desirable orientation and another having a uniformly undesirable orientation. A problem is that a turntable does not normally pass to a file an article having a first orientation, then turn an article having a second orientation and pass it to the same file. Consequently, in turning errant ones in a file of laterally advanced articles, a bypass arrangement with divergent and convergent tracks is sometimes utilized to achieve a single file of uniformly oriented articles.

It is incidentally noted that machines which receive, sense and turn longitudinally asymmetric articles which are axially advanced, do sometimes pass therethrough articles having a correct orientation. Unfortunately, such machines are not seen to address the problems associated with articles which are laterally advanced in a single file. Nor do the machines uniformly orient articles with respect to a transversely asymmetric shape.

Accordingly, it is desirable to develop new and improved expedients for orienting asymmetrically shaped articles. It is further desirable to uniformly orient articles which are asymmetrically shaped with respect to a longitudinal datum alone or also to a transverse datum. In a single file of such articles which are laterally advanced, it is desirable to turn errant ones to achieve a singular file of articles having a uniform orientation. It is also advantageous to achieve the desired orientation utilizing expedients which are simple, inexpensive and efficient.

SUMMARY OF THE INVENTION

The instant invention includes apparatus for reorienting at least one of a plurality of articles to achieve uniform orientation thereof. The articles typically have a head and a body portion depending therefrom along a plane dividing the head asymmetrically. A first portion of the head has a first, fully developed shape and a second portion has a second shape wherein at least one segment is omitted. A powered track is conveniently utilized to guidably advance the articles in a single file. The body portions are disposed therein with their respective dividing planes lying substantially along a common plane passing longitudinally of a feed section of the track.

An article has a desirable orientation when its fully developed head portion faces in a particular direction, such as to the front of the track. Conversely, an article has an undesirable orientation when its head portion with the omitted segment faces to the front of the track. A turning station is disposed in and contains a portion of the track, such station being adapted and utilized for:

(1) guidably passing to a subsequent discharge section of the track, articles advanced into the station with the desirable orientation and blocking an article advanced therein having the undesirable orientation, such blocking also stopping further advancement of the file before a trailing article has entered the station; and (2) turning the station track with the blocked article therein sufficiently to engage the previously trailing end of station track to the subsequent discharge track and discharging thereto the turned article now having the desirable orientation.

In an embodiment for reorienting more than one article in a file, the station is adapted for resetting. By such resetting, succeeding articles are passed or turned as required by their respective orientations to achieve uniform orientation of the plurality. A previously leading end of the station track is engaged to the feed track and a blocking member is positioned to again block an article advanced into the station with the undesirable orientation.

BRIEF DESCRIPTION OF THE DRAWING

The invention will be more readily understood from the following detailed description when read in conjunction with the accompanying drawing wherein.

It can be seen that some elements in the figures are abbreviated or simplified to highlight certain features of the invention. Also, where appropriate, reference numerals have been repeated in the figures to designate the same or corresponding features in the drawing.

DETAILED DESCRIPTION

The Articles

Figure 1:
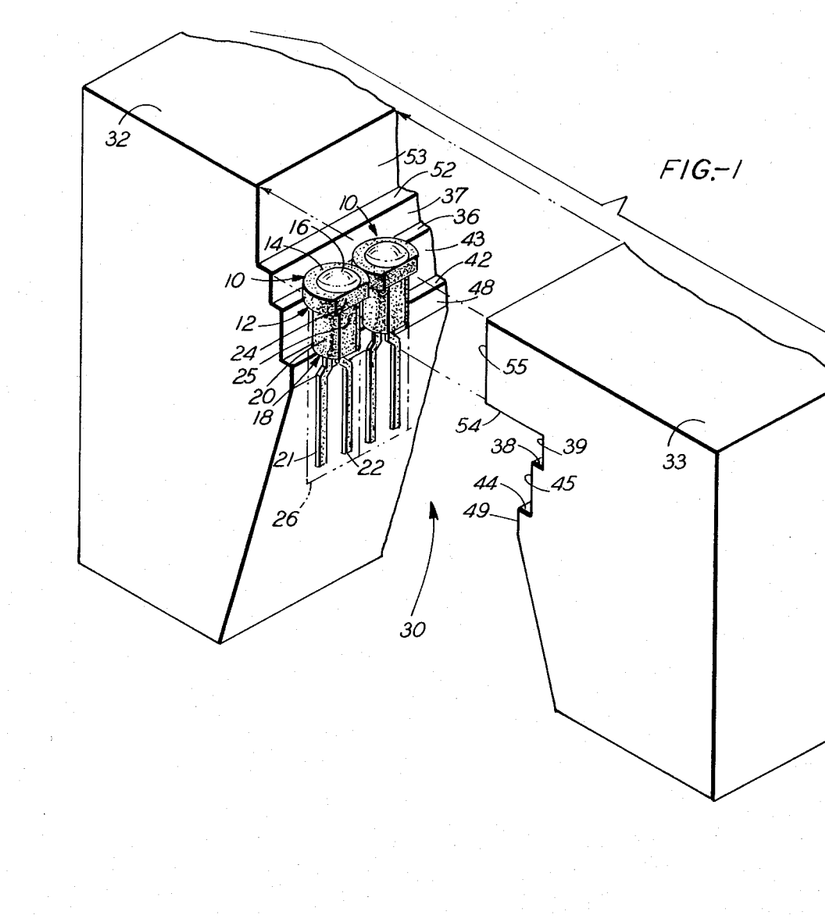
FIG. 1 is an exploded, pictorial view of a portion of track for guidably advancing the articles in accordance with the instant invention.
Figure 4:
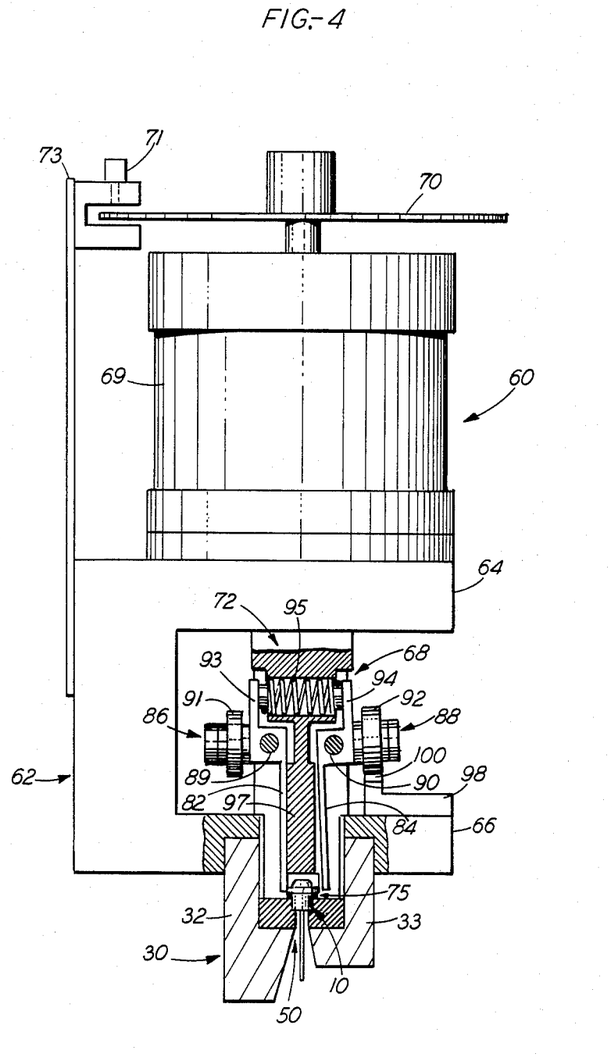
FIG. 4 is a partially sectional view of the track and station shown in FIG. 2 taken along lines 4—4.

FIGS. 1 and 4 illustrate one or more typical articles 10 which may be oriented in the practice of the invention. For purposes of illustration and discussion, such article 10 is selected from a family of lamps having solid state elements known in the art and further referred to herein as LEDs or devices 10.

A device 10 has an optical head 12 formed by a partial disc 14 supporting a dome 16. A body portion 18 depends from head 12 and for the particular article 10 selected, such body includes a partial cylinder 20 and a pair of closely spaced, parallel leads 21 and 22.

Optical head 12 encloses a light emitting diode in a chip (not shown) and the cylinder 20 protects vulnerable connections from the chip to the leads 21 and 22. The type of lamp is not critical to the invention but it does illustrate why article 10 has directional features. For example, disc 14 and cylinder 20 have corresponding segments omitted to form polarity-indicating features thereon known as flats 24 and 25, respectively. When device 10 is held with head 12 upright and flats 24 and 25 are turned toward a viewer as shown in FIG. 1, current flowing from lead 21 through the chip to lead 22 produces light transmitted primarily through dome 16. One or both of the flats 24 and 25 may be marked to indicate the operational polarity. In the practice of the invention, the distinctive shape of head 12 will be conveniently utilized to control orientation of device 10.

Device 10 is advantageously assembled in a lead frame environment which explains why leads 21 and 22 typically lie along a plane 26. Body portion 18, including cylinder 20 and leads 21 and 22, depend from head 12 along plane 26 which serves as a further reference for orientation. For example, a longitudinal extension of plane 26 shows that head 12 is thereby divided asymmetrically with respect to plane 26 taken as a datum. The portion of head 12 disposed to the rear of plane 26 in FIG. 1 is fully developed while the portion disposed to the front has an omitted segment indicated by flat 24. The cylinder portion of body 18 is also divided asymmetrically but this is of little importance to the present discussion.

Because head 12 of article 10 has irregular features when scanned transversely from front to back in FIG. 1, it will be considered to be transversely asymmetric in shape. It is incidentally seen that article 10 also has irregular features when scanned longitudinally making it asymmetrical with respect to a transverse datum. Such longitudinal asymmetry is of convenience herein for simplifying the preferred embodiment of the invention. For example, the planarity of leads 21 and 22 is advantageously utilized to control rotation of each device 10 and the cylinder 20 is utilized to vertically support such a device as it is guidably advanced.

Although the invention is directed toward orienting asymmetrically shaped articles, emphasis is placed primarily upon those articles which are transversely irregular with or without longitudinal irregularity. For example, device 10 could be longitudinally symmetrical and still be oriented with respect to plane 26. Consequently, the invention is not limited to articles 10 having two types of asymmetrical shape. Also, the reason for asymmetry in shape is generally unimportant to the invention. Consequently, articles 10 need not be LEDs nor even electrical devices. The invention is clearly applicable to a wide range of articles having an irregular shape wherein at least one in a plurality is misoriented and should be turned.

Advancing the Articles

Articles such as devices 10 are typically manufactured by some technique wherein a plurality thereof becomes disorganized. For example, the illustrative devices 10 are typically assembled in a lead frame environment wherein all LEDs are uniformly oriented with respect to each other. Unfortunately, when the devices 10 are separated from the lead frame they become disorganized and should be uniformly oriented for a subsequent operation.

One such operation comprises testing the lamps in devices 10 for opens, shorts and operating parameters. Another such operation comprises trimming and shaping the leads 21 and 22 so the bottom portions thereof are aligned in an offset plane parallel to plane 26. It will be appreciated that the offset portion of the shaped leads can be formed to either side of head 12 but they are typically formed on the side of flats 24 and 25 for correct polarity. Otherwise a device 10 may be improperly oriented on a PC board and may not emit light because the chip is improperly biased. Consequently, it is desirable to feed devices 10 to a subsequent operation by first uniformly orienting them with respect to each other and to the direction which the operation requires.

A disorganized mass of such devices 10 is typically loaded into the bowl of a vibratory feeder (not shown). A conventional feeder may randomly orient the devices and feed them longitudinally or laterally to one another along a single file. For purposes of the invention, it is desirable that the devices 10 be fed laterally and in single file into a guide such as the track 30 best shown in FIG. 1.

To guidably advance the devices 10, track 30 has a system of opposing ledges and walls provided in back and front members 32 and 33, respectively, which are set apart for illustration in FIG. 1. For example, back ledge 36 and wall 37 in cooperation with front ledge 38 and wall 39 confine and guide the disc 14. Back ledge 42 and wall 43 in cooperation with front ledge 44 and wall 45 support and guide the cylinder 20. Otherwise a device 10 could be slightly tilted because the disc 14 is not supported by a ledge 36 or 38 where flat 24 of such device is presented. Back wall 48 and front wall 49 advantageously form a longitudinal slot which will be designated by the numeral 50 and will be further functionally described hereinafter. It will also be seen that back ledge 52 and wall 53 cooperate with front ledge 54 and wall 55 to close the track when members 32 and 33 are brought together.

Requisite power to move the devices 10 along track 30 may be provided in several forms including compressed air, gravity or mechanical vibrations. To avoid abrasion of the heads 12 and cylinders 20 against the ledges and walls 36-49, it is preferred to use compressed air. Applying compressed air in tracks to suitably advance articles such as devices 10 can be done by many techniques which are well known in the art and need not be described herein.

As can be seen in FIG. 1, the articles 10 are advanced laterally in a single file manner so that, by stopping one article, all trailing articles are also stopped. Also, the body portions 18 are disposed with their respective dividing planes 26 lying substantially along a common plane (not shown). Such plane passes longitudinally of and adjacent to walls 48 and 49 of track 30, i.e., along slot 50 shown in FIGS. 3A-3D and 4.

The invention functions, inter alia, by blocking a portion of track at appropriate walls and ledges guiding the disc 14 of a device 10. If the flat 24 of a device 10 is presented toward a blocking member, the device passes; if the fully developed portion of head 12 is presented thereat, the device 10 is blocked and reoriented. Consequently, articles 10 should be guidably advanced so a head 12 has a first orientation, considered desirable for the preferred embodiment herein, when a flat 24 faces toward back member 32. Concomitantly, when its flat 24 faces toward front member 33, an article 10 will have a second, undesirable orientation as shown in FIG. 1 for clarity of description.

Most articles fed into a guide will typically assume random orientations unless there are some limitations associated with the articles themselves and/or with the guide. In the practice of the invention, it is appropriate that each article 10 assume one of two optional orientations just described for guidably advancing such articles. Fortunately, the device 10 selected for illustration has leads 21 and 22 which cooperate with slot 50 in track 30 to limit the options. However, it is expected that other articles 10 amenable to the practice of the invention may not have restrictive features such as the leads 21 and 22 which cooperate with restrictive features of guides such as slot 50 in a track 30. Nevertheless, one of ordinary skill in the art could readily devise means to limit orientation of typical articles 10 to two options. For example, movable guide mechanisms could be utilized to engage an article 10 and guidably advance it with either of the described orientations in an open or closed track to feed a turning mechanism.

Turning Articles

As mentioned above, the invention takes advantage of the transversely asymmetric shape of an article 10 to discern its orientation. Accordingly, a member is at least partially disposed in front of wall 37 and slightly above ledge 36 such that a device 10 presenting its fully developed portion of disc 14 thereat is blocked; a device 10 presenting its head portion with an omitted segment indicated by its flat 24 passes therethrough. Given such expedient for discerning orientation, there remains the additional problem of turning a misoriented article 10 so a file of articles can further advance in the track 30. The turning station and means associated therewith shown variously in FIGS. 2, 3A-3D and 4 comprise a preferred embodiment to implement the discerning, passing, blocking and turning functions. Unless otherwise set forth herein, reference to a turning station shall include all apparatus associated with the functions inherent in uniformly orienting the articles 10 as they are advanced to the station.

Figure 2:
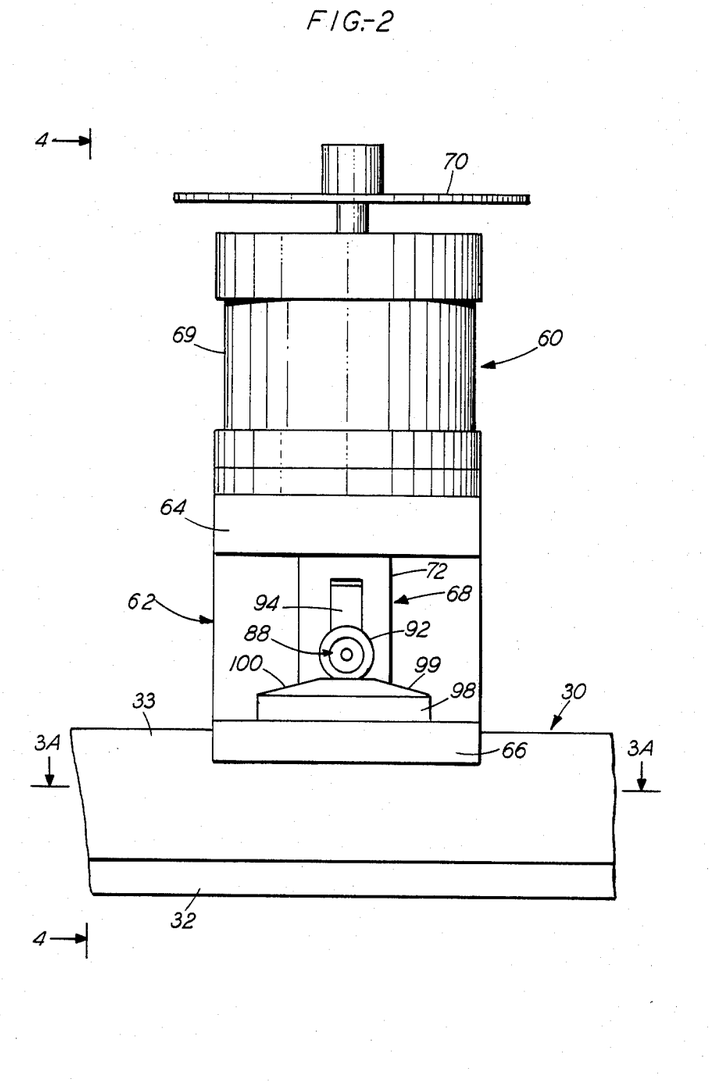
FIG. 2 is a front elevation of a portion of track and a turning station for achieving uniform orientation of articles in accordance with the instant invention.

FIG. 2 is a front elevation of a portion of track 30 and a turning station designated generally by the numeral 60. FIG. 4 is a partially sectional view of the portion of track 30 and station 60 shown in FIG. 2 taken along lines 4—4. FIGS. 2 and 4 show that top portions of members 32 and 33 have been omitted at station 60 so a bracket 62 having top and bottom portions 64 and 66, respectively, supports most of station 60 just over an article 10 in track 30. Station 60 further includes a turning portion 68 driven by a motor 69 which is attached to a control plate 70. The controls for motor 69 further include a sensor 71 supported from bracket 62 by a bracket 73. The operation of motor 69 and its controls will be explained later.

Portion 68 includes a vertically extending housing 72 having a lower portion rotatable in track 30 and containing a special section 75 with ledges and walls to support and guide an article 10. The lower portion is further shown in FIGS. 3A-3D which are sectional views of track 30 and station 60 taken along line 3A—3A shown in FIG. 2. As shown in FIGS. 3A-3D, a rotatable housing 72 has wall segments 76 and 77 adjacent the sides of track 75 and openings 78 and 80 therein to accommodate blocking members 82 and 84. Segments 76 and 77 further have wedge portions 83 and 85, respectively, which provide tapered edges as housing 72 turns to assist in the blocking function which will be explained hereinafter.

Referring again to FIG. 4, the blocking members 82 and 84 are vertically suspended in housing 72 with lower portions thereof in an active or an inactive position with respect to track 75. FIG. 4 shows member 82 in an active position in track 75 such that a device 10 presenting its fully developed portion of disc 14 thereat is blocked. Also, a device 10 presenting its head portion with an omitted segment is passed through station 60.

A pair of lever arms 86 and 88 extend from externally opposite sides into and are pivotally supported by housing 72 at pins 89 and 90, respectively. Each arm 86 and 88 is fixedly attached to and suspends at its internal end a respective blocking member 82 and 84. Also, each arm 86 and 88 supports at an external end a roller 91 and 92, respectively, which rotates in a plane normal to its arm. Intermediate each roller 91 and 92 and each pin 89 and 90, respectively, brackets 93 and 94 are affixed to the arms. Between such brackets a spring 95 is mounted to bias the arms 86 and 88 externally downward and pivotally counter to one another.

A camming member 98 at the front of station 60 has a camming surface 99, best seen in FIG. 2, to engage a roller 91 or 92 as the housing 72 is turned. For example, the cam 98 is shown in FIGS. 2 and 4 engaged to roller 92 whereby lever arm 88 is moved upwardly and whereby the lower portion of blocking member 84 is moved to an inactive position out of track 75. Camming member 98 also has a camming surface 100 (FIG. 2) to further engage a respective roller such as roller 92 as it is later turned by housing 72 away from the front of station 60. Therefore, lever arm 88 is later biased downwardly by spring 95 to thereby move the lower portion of blocking member 84 to an active position in track 75. Consequently, each time housing 72 turns 180 degrees, a different roller 91 or 92 engages cam 98 and the respective blocking member 82 or 84 is moved to an inactive position. The unengaged blocking member 82 or 84 is biased against a medial stem 97 of housing 72 which serves to accurately position the lower portion of the respective member for its blocking function.

The operation of turning station 60 is further explained by reference to FIGS. 3A-3D which show steps in a technique for achieving uniform orientation of a plurality of articles 10, which articles are labelled for convenience with the numerals 101-106.

Figure 3A:
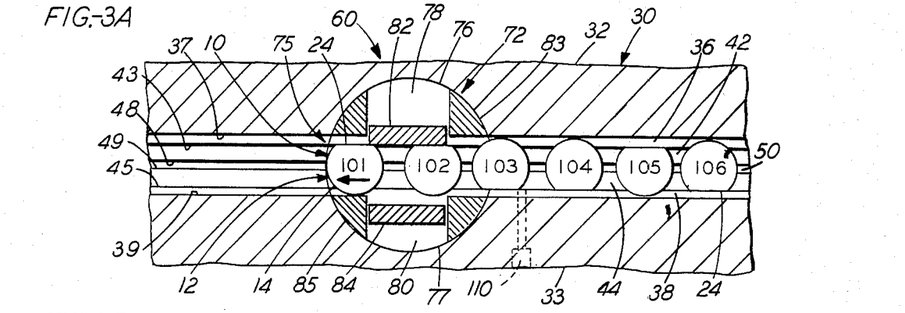
FIG. 3A is a cross section of the track and station shown in FIG. 2 taken along lines 3A—3A wherein articles having a desirable orientation are passed therethrough.

Assume that a leading article 101 and a next trailing article 102 are advanced into the station track 75 with the given desirable orientation as shown in FIG. 3A. The distinctive heads 12 of such articles 10 are presented in station 60 to member 82 which is set in an active position to block portions of discs 14 which may be advanced along ledge 36. Note that the opposing member 84 is biased away from track 75 in an inactive position with respect to a blocking function. Since articles 101 and 102 present their respective flats 24 to member 82, the respective articles pass through station track 75 to the subsequent portion of track 30. However, it will be noted that a trailing article 103 is partially advanced into station 60 with the given undesirable orientation.

Figure 3B:
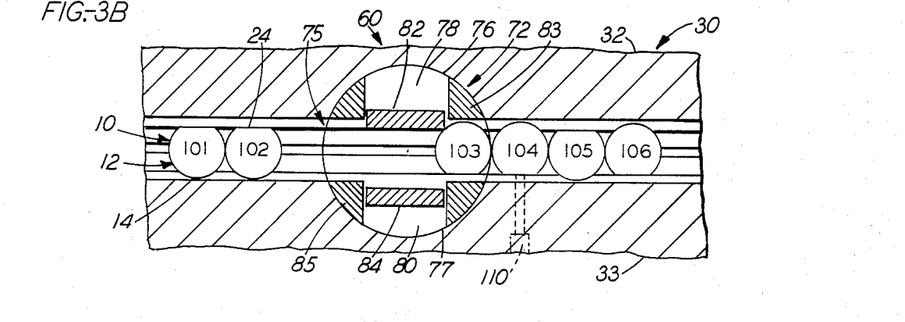
FIG. 3B is the same view as FIG. 3A, further depicting an article having an undesirable orientation being blocked in the station.

FIG. 3B shows a next condition where member 82 has blocked article 103 by obstructing its fully developed portion of head 12 advanced along ledge 36. Note that substantially all of article 103 has entered station track 75 whereas substantially all of trailing article 104 is stopped outside station 60. Note also that the preceding article 102 has fully passed beyond station 60. Station 60 is then ready to turn the errant article 103 and it is accordingly desirable that a control system sense the condition shown in FIG. 3B and supervise the turning operation.

Figure 3C:
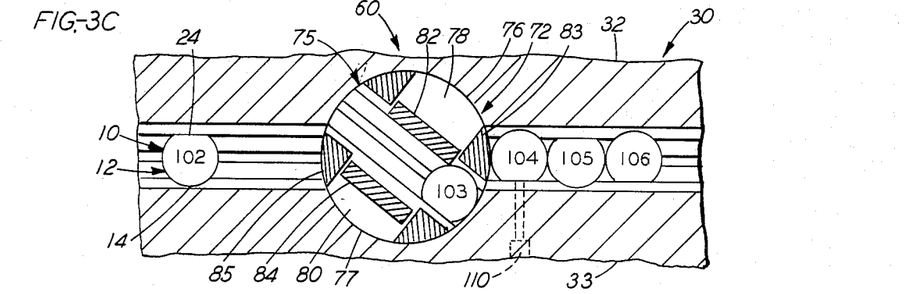
FIG. 3C is the same view as FIG. 3B, further depicting the blocked article partially turned in the station.

A sensor 110 in the feed portion of track 30 is utilized to sense the presence of a body portion 18 of an article 10 just ahead of station 60. The sensor 110 operates at wall 45 (FIG. 1) such that gaps appear between articles 10 because the cylinders 20 are smaller than the discs 14. When an article remains for a given time at sensor 110, a blockage is indicated and motor 69 of station 60 turns housing 72 and track 75. The turning step is best shown in FIG. 3C.

Housing 72 rotates in a clockwise direction until sensor 71 in FIG. 4 detects an opening in plate 70 indicating rotation of housing 72 by 180 degrees. The turning of track 72 is best shown in FIG. 3C where track segments 76 and 77 simultaneously turn and wedge portion 83 leads and engages its arcuate portion against trailing article 104. By such engagement article 104 is blocked and effectively prevented from entering station 60 or interfering with the turning operation until station 60 is reset to pass or block another article 10.

Figure 3D:
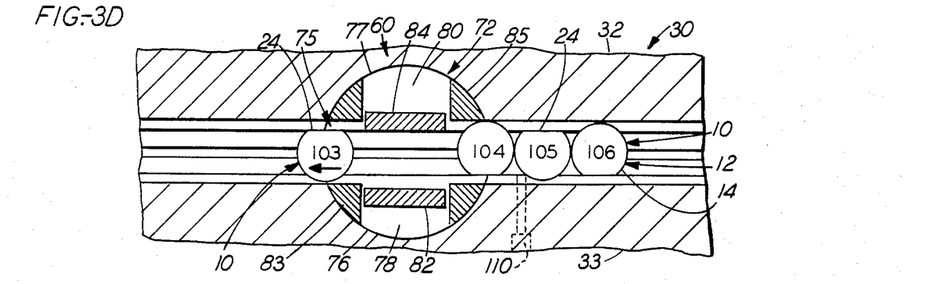
FIG. 3D is the same view as FIG. 3A, further depicting the now fully turned article being discharged from the station.

FIG. 3D shows the condition of station 60 after housing 72 has been rotated 180 degrees. The now reoriented article 103 is being discharged from station 60 because the previously trailing end of track 75 is engaged to the subsequent portion of track 30. To further reset station 60, the previously leading end of track 75 is engaged to the feed portion of track 30. Also, the member 82 has been biased away from track 75 and member 84 has been biased over ledge 36 to again block an article 10 such as article 104 which now is advanced into station 60 with the undesirable orientation.

Alternate Embodiments and Considerations

It will be appreciated that the invention is described with respect to a track 30 which is advantageously linearly disposed at least in the vicinity of station 60. Consequently, articles 10 having a desirable orientation pass through station 60 along a straight pathway from the feed portion to the discharge portion of track 30. An article 10 having an undesirable orientation is blocked in station 60 and is turned 180 degrees to acquire the desirable orientation. Also, the motor 69 is so controlled that the station track 75 is successively turned 180 degrees in the same rotational direction for every errant article to turn the same and discharge it into the subsequent track.

On the other hand, it is evident that the track in the vicinity of station 60 need not be linearly disposed. For example, track 75 in station 60 could be so disposed that articles 10 advanced therethrough are guided along an arcuate pathway deflecting toward the front or the back of track 30. Accordingly, in turning a misoriented article 10, the station track would be turned clockwise sufficiently to engage the trailing end of station track to the discharge track. After the reoriented article is discharged, the station track would be turned counterclockwise to again reset station 60 to pass or block articles 10 advanced therein.

It will also be appreciated that the blocking function within station 60 could be performed by other expedients available to those of ordinary skill in the art. For example, members 82 and 84 could be replaced with vertically reciprocating members driven by solenoid coils or by air operated cylinders and pistons. Further, it is evident that such blocking could as well take place at ledge 38 in the front of station track 75 whereby the desirable orientation could be opposite to that shown and described.

The operation of station 60 is described with respect to motor 69 which advantageously is of the type suitable for stepping operation. Also, sensors suitable for items 71 and 110 include reflective type photocells and circuit elements complementary therewith such as timers and switches could be utilized to control motor 69 in a conventional manner. However, it is presently preferred to exploit the greater speed and versatility of a programmable, general purpose microprocessor.

Figure 5:
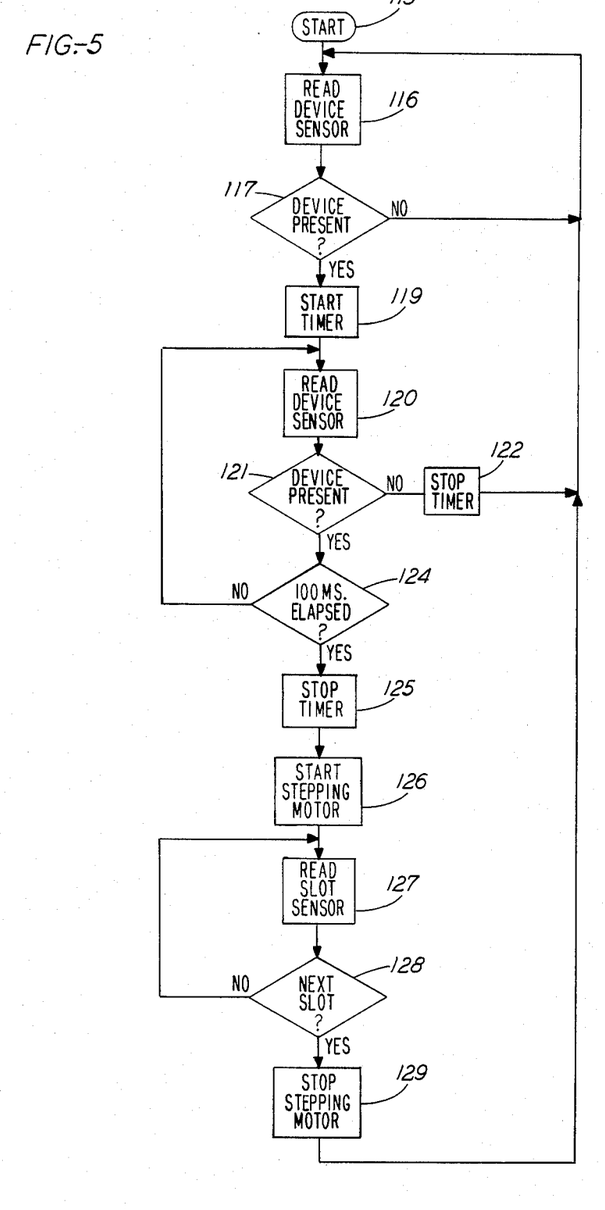
FIG. 5 is a flow chart of a program by which a microprocessor controls an operation for uniformly orienting articles in accordance with an embodiment of the instant invention.

An abbreviated program comprising typical routines for responding to sensors 71 and 110 to operate motor 69 is represented in the flow chart shown in FIG. 5. The chart comprises a number of process blocks (PB) and decisional blocks (DB) representing typical microprocessor operations. Standard programming techniques, known in the art, may be further employed to reduce the flow chart to equivalent machine language in a known manner. It will be recognized that only the process-oriented portion of the overall program is represented in FIG. 5. In addition, there is provided the customary system software including, for example machine control, which are well known and not required for an understanding of the invention.

The program starts at a circuit terminal represented by a flat oval 115. Device sensor 110 is read according to PB 116 and a data field is examined according to DB 117 to determine whether a device 10 is present just prior to turning station 60. If a device is not present, sensor 110 is continually read, but if a device 10 is present, a timer (not shown) is started according to PB 119. Sensor 110 is again read according to PB 120 and a data field examined according to DB 121 to make sure the respective device is still present. If the device 10 has passed into station 60, the single file of articles has not been blocked so the timer is stopped according to PB 122. However, if the device 10 is still present, another data field is examined according to DB 124 to see if 100 milliseconds (m.s.) have elapsed since the sensor 110 detected the device 10. Such an elapse of time indicates that the file is blocked and an errant article should be turned. Of course, if 100 m.s. have not elapsed, a loop returns the program to PB 120, DB 121 and DB 124 until the time has elapsed. Then the timer is stopped according to PB 125 and stepping motor 69 is started according to PB 126.

While motor 69 is turning housing 72, the sensor 71 (FIG. 4) has its light continually reflected and sensor 71 is read according to PB 127 until an opening appears in plate 71 signifying that the track 75 has been turned through 180 degrees. When examination of a data field according to DB 128 shows that sensor 71 is satisfied, the motor 69 is stopped according to PB 129 and the turning is complete. Of course, during the turning the blocking members 82 and 84 are repositioned and the appropriate ends of track 75 are again engaged to track 30 to complete resetting station 60 for a next misoriented device 10.

There have been illustrated herein certain practical embodiments of the invention and certain applications thereof. Nevertheless, it is to be understood that various modifications and refinements may be made and used which differ from these disclosed embodiments without departing from the spirit and scope of the present invention.

What is claimed is:

1. Apparatus for reorienting at least one of a plurality of articles, each having a head and a body portion depending therefrom along a plane dividing the head asymmetrically wherein a first lateral portion has a first shape and a second lateral portion has a second shape, comprising:
   means for guidably advancing the articles laterally to one another in a single file wherein the body portions are disposed with their respective dividing planes lying substantially along a common plane passing medially, longitudinally of a feed section of a track and each head has a first orientation when its first portion is facing in a first direction toward a first side of the track and a second orientation when its first portion is facing in a second, substantially opposite direction;
   a turning station disposed in and containing a portion of the track, said station having means associated therewith for passing, blocking and turning the articles including:
   a vertically extending housing having a lower portion rotatable in and containing the station track, there being wall segments adjacent the sides of said track with openings therein to accommodate blocking members;
   a pair of blocking members suspended in the housing, such members having lower portions disposed at the station track, one in an active position in the track in the station and one in an inactive position out of said track such that an article entering the housing with the first orientation is guidably passed to a subsequent discharge section of the track and an article entering with the second orientation presents its first head portion having the first shape to the lower portion of the member in the active position and is blocked by said member from further advancement, said article also being so blocked that it further blocks advancement of the file before substantially any portion of a trailing article has entered the track in the housing;
   means for turning the housing with the station track and the blocked article therein sufficiently to engage a previously trailing end of the station track to the subsequent discharge track and for discharging thereto the turned article now having the first orientation, including on said wall segments of the housing, wedge portions which lead as the housing turns and engage arcuate portions of the wall segments against a trailing article to block the same from entering the station until the station is reset to pass or turn succeeding articles.

2. Apparatus as in claim 1, wherein the turning station and means associated therewith further comprises:
   a pair of lever arms extending from externally opposite sides, respectively, into and pivotally supported by the housing, each arm being fixedly attached to and suspending at an internal end a respective blocking member and supporting at an external end a roller which rotates in a plane normal to the arm, there being means intermediate a roller and a pivot support of each arm for biasing the arms externally downward and pivotally counter to one another; and
   a camming member at a first side of the station, said cam having a first camming surface to engage a roller as it is turned by the housing to the first side of the station to move the respective lever arm upwardly and thereby to move the lower portion of a blocking member within the turning housing to an inactive position out of the track, such camming member also having a second camming surface to further engage the respective roller as it is later turned by the housing away from the first side of the station to move the respective lever arm again downwardly and thereby to move the lower portion of the blocking member to an active position in the track as the roller is turned by the housing toward a second substantially opposite side of the station.

3. Apparatus as in claim 2, wherein the means associated with the turning station further comprises:
   means for sensing the presence of an article within the station;
   means responsive to the sensing means for measuring the length of time an article remains within the station;
   means responsive to the timing means for turning the station housing when an article remains within the station for a length of time longer than it normally takes to advance through the station an article having the first orientation;
   means for sensing the angle through which the housing turns; and
   means responsive to the angle sensing means for stopping the housing when it has turned sufficiently to discharge an article having been reoriented to the first orientation.

* * * * *